US010481721B2

(12) United States Patent
Ding et al.

(10) Patent No.: US 10,481,721 B2
(45) Date of Patent: Nov. 19, 2019

(54) DISPLAY SUBSTRATE HAVING TOUCH FUNCTION, METHOD FOR DRIVING THE SAME AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Haisheng Wang, Beijing (CN); Yingming Liu, Beijing (CN); Weijie Zhao, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 204 days.

(21) Appl. No.: 15/037,899

(22) PCT Filed: Dec. 15, 2015

(86) PCT No.: PCT/CN2015/097420
§ 371 (c)(1),
(2) Date: May 19, 2016

(87) PCT Pub. No.: WO2016/145915
PCT Pub. Date: Sep. 22, 2016

(65) Prior Publication Data

US 2017/0108976 A1 Apr. 20, 2017

(30) Foreign Application Priority Data

Mar. 19, 2015 (CN) .......................... 2015 1 0123063

(51) Int. Cl.
*G06F 3/041* (2006.01)
*G06F 3/044* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
CPC .................. G06F 3/0416; G06F 3/044; G06F 2203/04107; G02F 1/13338;
(Continued)

(56) References Cited

U.S. PATENT DOCUMENTS

2010/0103089 A1 4/2010 Yoshida et al.
2010/0103121 A1* 4/2010 Kim ................... G02F 1/13394 345/173

(Continued)

FOREIGN PATENT DOCUMENTS

CN 102375585 A * 3/2012
CN 102375585 A 3/2012

(Continued)

OTHER PUBLICATIONS

First Office Action regarding Chinese application No. 201510123063.0, dated Aug. 1, 2016. Translation provided by Dragon Intellectual Property Law Firm.

(Continued)

*Primary Examiner* — Alexander Eisen
*Assistant Examiner* — Kebede T Teshome
(74) *Attorney, Agent, or Firm* — Harness, Dickey & Pierce, P.L.C.

(57) ABSTRACT

The present disclosure provides in some embodiments a display substrate having a touch function, a method for driving the display substrate and a display apparatus. The
(Continued)

method includes steps of: dividing touch driving electrodes included in the display substrate and parallel to gate lines into N portions, wherein each portion of the touch driving electrodes is arranged in a direction perpendicular to the gate lines, and N is a positive integer greater than or equal to 2; and resetting pixels corresponding to an $n^{th}$ portion of the touch driving electrodes before a touch driving for the $n^{th}$ portion is started, so that the pixels have a same grey scale value, wherein n is a positive integer greater than or equal to 1 and less than or equal to N.

16 Claims, 2 Drawing Sheets

(51) Int. Cl.
*G09G 3/36* (2006.01)
*G02F 1/1333* (2006.01)
*G02F 1/1362* (2006.01)
*G02F 1/1368* (2006.01)

(52) U.S. Cl.
CPC ........ *G02F 1/136286* (2013.01); *G06F 3/044* (2013.01); *G06F 3/0412* (2013.01); *G09G 3/36* (2013.01); *G09G 3/3607* (2013.01); *G09G 3/3648* (2013.01); *G02F 2201/123* (2013.01); *G06F 2203/04107* (2013.01); *G09G 2310/061* (2013.01); *G09G 2310/08* (2013.01)

(58) Field of Classification Search
CPC ............. G02F 1/136286; G02F 1/1368; G02F 2201/123; G09G 3/3607; G09G 2310/08
See application file for complete search history.

(56) References Cited

U.S. PATENT DOCUMENTS

2010/0328291 A1 12/2010 Ishizaki et al.
2013/0342478 A1* 12/2013 Bae ......................... G06F 3/041 345/173
2014/0252381 A1* 9/2014 Yu ....................... H01L 27/1248 257/88
2015/0054781 A1 2/2015 Miyamoto et al.
2016/0179273 A1* 6/2016 Lee ....................... G06F 3/0416 345/174

FOREIGN PATENT DOCUMENTS

CN 102822776 A 12/2012
CN 103176655 A 6/2013
CN 103309534 A 9/2013
CN 103513844 A 1/2014
CN 104049801 A 9/2014
CN 104182080 A 12/2014
CN 204129705 U 1/2015
CN 104680999 A 6/2015
TW 200949652 A 12/2009

OTHER PUBLICATIONS

Written Opinion of the International Searching Authority for international application No. PCT/CN2015/097420.

* cited by examiner

DISPLAY SUBSTRATE HAVING TOUCH FUNCTION, METHOD FOR DRIVING THE SAME AND DISPLAY APPARATUS

CROSS REFERENCE OF RELATED APPLICATIONS

This application is the U.S. national phase of PCT Application No. PCT/CN2015/097420 filed on Dec. 15, 2015, which claims a priority of the Chinese patent application No. 201510123063.0 filed on Mar. 19, 2015, the disclosures of which are incorporated in their entirety by reference herein.

TECHNICAL FIELD

The present disclosure relates to the technical field of displaying, and in particular to a display substrate having a touch function, a method for driving the display substrate and a display apparatus.

BACKGROUND

Touch screens may be classified into categories such as resistive touch screens, self-capacitive touch screens, and mutual-capacitive touch screens according to their different operating principles. Among them, the mutual-capacitive touch screens have advantages such as high sensitivity and multi-touch, and are used more and more widely.

Specifically, a mutual-capacitive touch screen includes touch driving electrodes and touch sensing electrodes that are crossing and insulated from each other. Mutual capacitors are formed between touch driving electrodes and touch sensing electrodes. When a finger touches the touch screen, capacitance values of the mutual capacitors are changed, and thereby signals from the touch sensing electrodes are changed accordingly. A position of the finger touch may be accurately detected by scanning the touch driving electrodes line by line and obtaining the signals from the touch sensing electrodes. A mutual capacitive touch screen is typically embedded in a liquid crystal display (LCD), i.e. the touch driving electrodes and the touch sensing electrodes are arranged within the LCD, so as to improve light transmissibility, reduce a thickness of the LCD and reduce cost for manufacturing the touch screen.

The inventors of the present application find out that, when the mutual capacitive touch screen is embedded in the LCD, the capacitance values of the mutual capacitors are affected by deflection of liquid crystal molecules, i.e. dielectric coefficients of dielectrics between the touch driving electrodes and the touch sensing electrodes are changed when the liquid crystal molecules at a position are deflected, and thereby the capacitance values of the mutual capacitors are changed accordingly. Thus, the signals from the touch sensing electrodes are changed. As a result, a position of the finger touch might be difficult to be detected accurately due to the fact that a difference caused by the finger touch and the deflection of the molecules cannot be determined because of uncertainty of the deflections of the molecules.

SUMMARY

An object of the present disclosure is to provide a display substrate having a touch function, a method for driving the display substrate and a display apparatus, so as to prevent the mutual capacitor from being adversely affected by the deflections of the liquid crystal molecules, and improve the accuracy of touch detecting.

In one aspect, the present disclosure provides in some embodiments a method for driving a display substrate having a touch function and includes the following technical solutions.

A method for driving a display substrate having a touch function, includes steps of: dividing touch driving electrodes included in the display substrate and parallel to gate lines into N portions, wherein each portion of the touch driving electrodes is arranged in a direction perpendicular to the gate lines, and N is a positive integer greater than or equal to 2; and resetting pixels corresponding to an $n^{th}$ portion of the touch driving electrodes before a touch driving for the $n^{th}$ portion is started, so that the pixels have a same grey scale value, wherein n is a positive integer greater than or equal to 1 and less than or equal to N.

Alternatively, a touch driving time period for the $n^{th}$ portion coincides with a display scanning time period for at least another portion of the touch driving electrodes.

Alternatively, a display scanning time period for the $n^{th}$ portion coincides with a touch driving time period for an $(n+1)^{th}$ portion of the touch driving electrodes; and a display scanning time period for the $N^{th}$ portion of the touch driving electrodes coincides with a touch driving time period for a first portion of the touch driving electrodes.

Alternatively, the step of resetting the pixels corresponding to the $n^{th}$ portion of the touch driving electrode includes steps of: enabling the gate lines for controlling the pixels corresponding to the $n^{th}$ portion; and supplying a same voltage to the pixels corresponding to the $n^{th}$ portion.

Alternatively, the step of enabling the gate lines for controlling the pixels corresponding to the $n^{th}$ portion includes a step of: inputting a reset enabling signal for enabling the gate lines for controlling the pixels corresponding to the $n^{th}$ portion.

Alternatively, the voltage is of a value determined by experiments to have a minimal affect on a display effect of a display apparatus including the display substrate.

Alternatively, the voltage is of a value to enable the grey scale value of the pixels corresponding to the $n^{th}$ portion to be 0.

Alternatively, after display scanning for a first portion to an $N^{th}$ portion of the touch driving electrodes is finished, pixels corresponding to the first portion to the $N^{th}$ portion are reset so that the pixels have a same grey scale value, and touch driving for the first portion to the $N^{th}$ portion is started at the same time.

Alternatively, the $n^{th}$ portion is a portion of the touch driving electrodes that is close to touch sensing electrodes, and merely the pixels corresponding to the $n^{th}$ portion are reset.

Alternatively, during a touch driving time period for the $n^{th}$ portion, a touch driving signal is applied to the $n^{th}$ portion of the touch driving electrodes; and during a display scanning time period for the $n^{th}$ portion, a common electrode signal is applied to the $n^{th}$ portion of the touch driving electrodes.

The present disclosure provides in some embodiments a method for driving a display substrate having a touch function, including steps of: dividing touch driving electrodes included in the display substrate and parallel to gate lines into N portions, wherein each portion of the touch driving electrodes is arranged in a direction perpendicular to the gate lines, and N is a positive integer greater than or equal to 2; and resetting pixels corresponding to an $n^{th}$ portion of the touch driving electrodes before a touch driving for the $n^{th}$ portion is started, so that the pixels have a same grey scale value, wherein n is a positive integer greater than or equal to 1 and less than or equal to N. Therefore, all liquid crystal molecules corresponding to the $n^{th}$ portion are in a same defection state, so as to prevent the mutual capacitors between the touch driving electrodes and the touch sensing electrodes from being adversely affected by the deflections of the liquid crystal molecules, and improve the accuracy of touch detecting.

The present disclosure further provides in some embodiments a display substrate having a touch function, including a plurality of touch driving electrodes extending in a direction parallel to gate lines, wherein the touch driving electrodes are divided into N portions, each portion of the touch driving electrodes is arranged in a direction perpendicular to the gate lines, and each portion of the touch driving electrodes is connected to a driving line, wherein N is a positive integer greater than or equal to 2; and pixels corresponding to an $n^{th}$ portion of the touch driving electrodes are capable of being reset to have a same grey scale value before a touch driving for the $n^{th}$ portion is started, so that liquid crystal molecules corresponding to the $n^{th}$ portion have a same deflection state, wherein n is a positive integer greater than or equal to 1 and less than or equal to N; during a touch driving time period for the $n^{th}$ portion, the $n^{th}$ portion of the touch driving electrodes is applied with a touch driving signal; and during a display scanning time period for the $n^{th}$ portion, the $n^{th}$ portion of the touch driving electrodes is applied with a common electrode signal.

Alternatively, the display substrate further includes the gate lines, data lines, thin film transistors (TFTs) and pixel electrodes, wherein the pixel electrodes include slits or are strip-shaped electrodes, and the touch driving electrodes are arranged above and insulated from the pixel electrodes.

Alternatively, the display substrate further includes shielding structures arranged above the data lines and arranged on a same layer as the pixel electrodes.

The present disclosure further provides in some embodiments a display substrate having a touch function, including a plurality of touch driving electrodes extending in a direction parallel to gate lines, wherein the touch driving electrodes are divided into N portions, each portion of the touch driving electrodes is arranged in a direction perpendicular to the gate lines, and each portion of the touch driving electrodes is connected to a driving line, wherein N is a positive integer greater than or equal to 2. Thus, pixels corresponding to an $n^{th}$ portion of the touch driving electrodes are capable of being reset to have a same grey scale value before a touch driving for the $n^{th}$ portion is started, so that all liquid crystal molecules corresponding to the $n^{th}$ portion have a same deflection state, so as to prevent the mutual capacitors between the touch driving electrodes and the touch sensing electrodes from being adversely affected by the deflections of the liquid crystal molecules, and improve the accuracy of touch detecting, wherein n is a positive integer greater than or equal to 1 and less than or equal to N.

The present disclosure further provides in some embodiments a touch display apparatus including any of the above display substrates having the touch display function.

Alternatively, the touch display apparatus further includes an reset-enabling-signal input module for inputting a reset enabling signal to the $n^{th}$ portion before a touch driving for the $n^{th}$ portion is started, wherein the reset enabling signal enables the pixels corresponding to the $n^{th}$ portion to be reset to have the same grey scale value, wherein n is a positive integer greater than or equal to 1 and less than or equal to N.

BRIEF DESCRIPTION OF THE DRAWINGS

In order to illustrate the technical solutions of the present disclosure or the related art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

REFERENCE SIGNS

Figure 1:
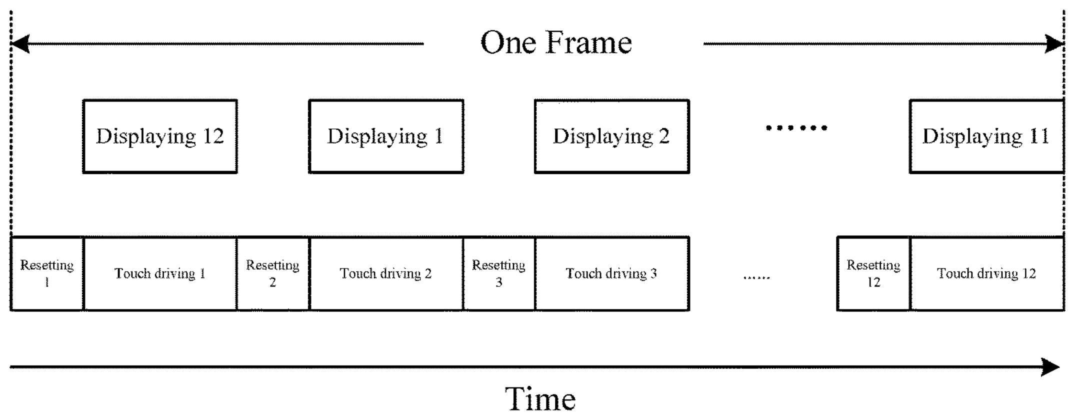
FIG. 1 is a schematic view showing a driving method according to an embodiment of the present disclosure.

1—touch driving electrode; 2—driving line; 3—touch sensing electrode; 4—pixel electrode; 5—shielding structure; 6—data line.

DETAILED DESCRIPTION

In the following, it is clearly and completely described the technical solutions according to the embodiments of the present disclosure. It is obvious that the described embodiments are some of the embodiments of the present disclosure rather than all of the embodiments. All of other embodiments that those skilled in the art may implement based on the embodiments of the present disclosure without creative work should also fall within the scope of the present disclosure.

Unless otherwise defined, any technical or scientific term used herein shall have the common meaning understood by a person of ordinary skills. Such words as “first” and “second” used in the specification and claims are merely used to differentiate different components rather than to represent any order, number or importance. Similarly, such words as “one” or “a” are merely used to represent the existence of at least one member, rather than to limit the number thereof. Such words as “connect” or “connected to” may include electrical connection, direct or indirect, rather than to be limited to physical or mechanical connection. Such words as “on”, “under”, “left” and “right” are merely used to represent relative position relationship, and when an absolute position of the object is changed, the relative position relationship will be changed too.

The present disclosure provides in some embodiments a method for driving a display substrate having a touch function (or a display substrate for short hereafter), so as to prevent the mutual capacitor from being adversely affected by the deflections of the liquid crystal molecules, and improve the accuracy of touch detecting.

In particular, the method includes steps of: dividing touch driving electrodes included in the display substrate and parallel to gate lines into N portions, wherein each portion of the touch driving electrodes is arranged in a direction perpendicular to the gate lines, and N is a positive integer greater than or equal to 2; and resetting pixels corresponding to an $n^{th}$ portion of the touch driving electrodes before a touch driving for the $n^{th}$ portion is started, so that the pixels have a same grey scale value, wherein n is a positive integer greater than or equal to 1 and less than or equal to N. As a result, during a touch driving time period for the $n^{th}$ portion, all liquid crystal molecules corresponding to the $n^{th}$ portion are in a same defection state, so as to prevent the mutual capacitors between the touch driving electrodes and the touch sensing electrodes from being adversely affected by the deflections of the liquid crystal molecules, and improve the accuracy of touch detecting. In addition, a time period for resetting the pixels corresponding to the $n^{th}$ portion is short, e.g. 4 ms, so that the resetting of the pixels corresponding to the $n^{th}$ portion may not affect the display quality of the display apparatus.

It should be noted that a value of the parameter N may be determined based on a plurality of factors such as a size and a resolution of the display substrate. For example, the value of the parameter N may be 12.

Furthermore, in this embodiment of the present disclosure, a touch driving time period for the $n^{th}$ portion coincides with a display scanning time period for at least another portion of the touch driving electrodes. As a result, compared with a mechanism of separating the touching driving time period from the display scanning time period in related art, the touch driving time period for the whole display substrate may be significantly increased, and the sensitivity of the touch detecting is improved.

In this embodiment of the present disclosure, although resetting of the pixels before the touch driving is started is needed and spends time, such time period might not extend a length of a frame. Alternatively, the length of one frame may be remained unchanged by properly reducing the display scanning time period for the pixels corresponding to each portion of the touch driving electrodes.

Alternatively, in this embodiment of the present disclosure, a display scanning time period for the $n^{th}$ portion coincides with a touch driving time period for an $(n+1)^{th}$ portion of the touch driving electrodes, and a display scanning time period for the $N^{th}$ portion of the touch driving electrodes coincides with a touch driving time period for a first portion of the touch driving electrodes, so as to enter the display scanning time period immediately after the touch driving time period for each portion of the touch driving electrodes elapses. At this point, the pixels corresponding to each portion are turned to have a displaying grey scale value instead of a resetting grey scale value, so as to prevent the pixels corresponding to each portion from having the resetting grey scale value for a long time and avoid affecting the display quality of the display apparatus adversely.

In order to facilitate understanding for a person skilled in the art, the present disclosure further provides in some embodiments a method for resetting the pixels corresponding to the $n^{th}$ portion of the touch driving electrodes including the following steps.

Step S1: enabling the gate lines for controlling the pixels corresponding to the $n^{th}$ portion.

For example, each pixel includes pixel units, and each unit includes a TFT and a pixel electrode, wherein a gate electrode of the TFT is connected to a gate line, a source electrode of the TFT is connected to a data line, and a drain electrode of the TFT is connected to the pixel electrode. When the gate line is enabled, the TFT controlled by the gate electrode connected to the gate line is turned on, and the source electrode is connected to the drain electrode, so as to transmit the signal from the data line to the pixel electrode and enable the gate line to control the pixel.

In particular, the step of enabling the gate lines for controlling the pixels corresponding to the $n^{th}$ portion includes a step of: inputting a reset enabling signal for enabling the gate lines for controlling the pixels corresponding to the $n^{th}$ portion. For example, the reset enabling signal may enable the gate lines for controlling the pixels corresponding to the $n^{th}$ portion sequentially by controlling a shift register connected to the gate lines to sequentially output the signals for enabling the gate lines. The reset enabling signal may be outputted by a reset-enabling-signal input module included in the display apparatus.

Step S2: supplying a same voltage to the pixels corresponding to the $n^{th}$ portion.

After enabling the gate lines for controlling the pixels corresponding to the $n^{th}$ portion, the TFTs controlled by the gate electrodes connected to the gate lines are turned on, and the source electrodes are connected to the drain electrodes, so as to transmit the signals from the data lines to the pixel electrodes. When the signals from the data lines are same, a same voltage may be inputted to the pixels corresponding to the $n^{th}$ portion.

It should be noted that, the present disclosure provides two manners for selecting the same voltage inputted to the pixel electrodes included in the pixels corresponding to the $n^{th}$ portion. In a first manner, the voltage is of a value determined by experiments to have a minimal impact on a display effect of a display apparatus including the display substrate, so as to minimize the impact of the resetting on the display quality. In a second manner, the voltage is of a value which enables a grey scale value of the pixels corresponding to the $n^{th}$ portion to be zero (0). As a result, the driving method is simplified, and for a display apparatus having an advanced super dimension switch (ADS) display mode, when the pixels have the grey scale value of zero (0), all of the liquid crystal molecules are of original orientations, and the deflections of the liquid crystal molecules are in consistence, so as to minimize the impact on the accuracy of touch detecting by the deflections of the liquid crystal molecules.

The present disclosure provides in some embodiments a method for driving the display substrate including steps of: dividing touch driving electrodes included in the display substrate and parallel to gate lines into 12 portions, as shown in FIG. 1; within a first frame, resetting pixels corresponding to a first portion of the touch driving electrodes (simplified as Resetting 1 in FIG. 1), and then implementing the touch driving for the first portion (simplified as Touch driving 1 in FIG. 1) and the display scanning for the twelfth portion (simplified as Displaying 12 in FIG. 1) simultaneously; next, resetting pixels corresponding to a second portion of the touch driving electrodes (simplified as Resetting 2 in FIG. 1), and then implementing the touch driving for the second portion (simplified as Touch driving 2 in FIG. 1) and the display scanning for the first portion (simplified as Displaying 1 in FIG. 1) simultaneously, and so on . . . ; resetting pixels corresponding to a twelfth portion of the touch driving electrodes (simplified as Resetting 12 in FIG. 1), and then implementing the touch driving for the twelfth portion (simplified as Touch driving 12 in FIG. 1) and the display scanning for the eleventh portion (simplified as Displaying 11 in FIG. 1) simultaneously.

Figure 2:
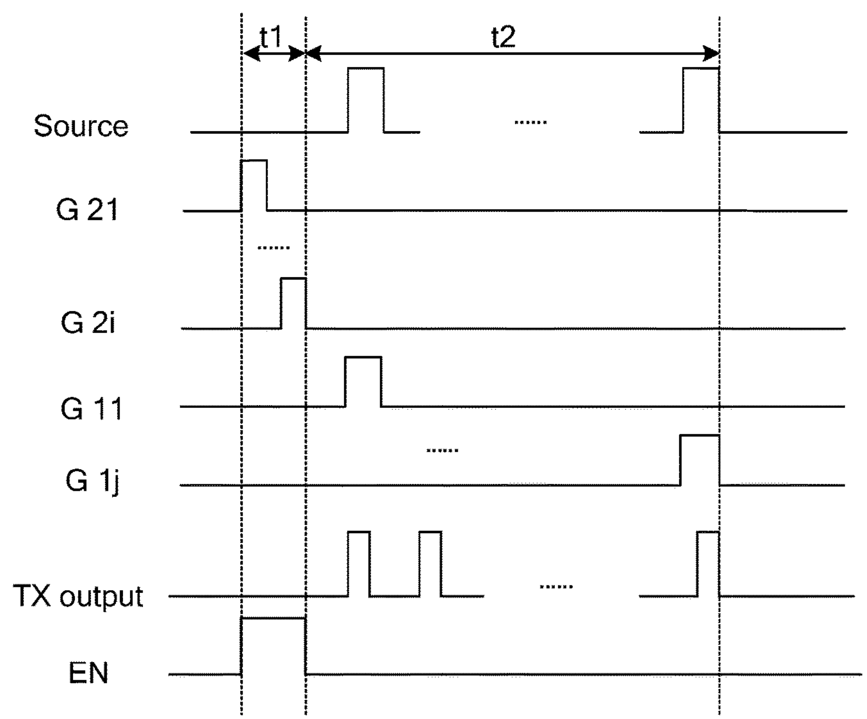
FIG. 2 is a timing sequence showing a driving method according to an embodiment of the present disclosure.

In the following, it is explained the step of resetting pixels corresponding to a second portion of the touch driving electrodes and then implementing the touch driving for the second portion and the display scanning for the first portion simultaneously in details by referring to the timing sequence of FIG. 2. As illustrated in FIG. 2, the pixels corresponding to the second portion is reset during a time period "t1". In particular, a reset enabling signal "EN" is of a high level, so as to enable signals "G21-G2i" on the gate lines for controlling the pixels corresponding to the second portion to be of a high level sequentially, where "i" represents the number of the gate lines for controlling pixels corresponding to the second portion. The gate lines are enabled sequentially, and a data signal "Source" from the data line is of a voltage which enables the grey scale value of the pixels corresponding to the second portion to be zero, for example, the data signal "Source" is a grounded (GND) signal, so as to reset the pixels corresponding to the second portion. During a time period "t2", the touch driving for the second portion and the display scanning for the first portion are implemented simultaneously. In particular, a touch driving signal "TX output" is inputted to the second portion of the touch driving electrodes, while signals "G11-G1j" on the gate lines for controlling the pixels corresponding to the first portion are turned to be of the high level and enabled sequentially, where j represents the number of the gate lines for controlling the pixels corresponding to the first portion, a data signal "Source" from the data line is a display voltage, so as to implement the touch driving for the second portion and the display scanning for the first portion simultaneously. The touch driving and the display scanning for other portions are similar, which is not repeatedly described herein.

It should be noted that, in the above driving method, the display scanning or the touch driving for merely a portion of the pixels is implemented in one time period for the display scanning or one time period for the touch driving. However, the present disclosure is not limited thereto. Alternatively, the method may further include: after display scanning for a first portion to an $N^{th}$ portion of the touch driving electrodes is finished, pixels corresponding to the first portion to the $N^{th}$ portion are reset so as to have a same grey scale value, and touch driving for the first portion to the $N^{th}$ portion is started at the same time. As a result, the method for driving the display substrate is simplified.

In addition, a capacitance value may be determined by an equation $C=\xi S/d$, where "$\xi$" represents a dielectric coefficient of dielectric between two electrical conductors (plates) of a capacitor, "S" represents an area of the two plates where they are right opposite to each other, and "d" represents a vertical distance therebetween. The less a value of "d" is, the more the impact on the capacitance value by the change of the "$\xi$" is. Thus, the impact on the accuracy of touch detecting by the deflection of the liquid crystal molecules mainly focuses on a region where the touch driving electrodes and the touch sensing electrodes are close to each other. As a result, the pixels corresponding to merely the $n^{th}$ portion where the touch driving electrodes and the touch sensing electrodes are close to each other may be reset so as to simplify the method for driving the display substrate.

In addition, a common electrode may be further used as the touch driving electrodes to simplify the structure of the display substrate and the method for manufacturing the display substrate. At this point, during a touch driving time period for the $n^{th}$ portion, a touch driving signal "TX output" is applied to the $n^{th}$ portion of the touch driving electrodes; and during a display scanning time period for the $n^{th}$ portion, a common electrode signal is applied to the $n^{th}$ portion of the touch driving electrodes.

The present disclosure provides in some embodiments a method for driving the display substrate having the touch function. The method includes steps of: dividing touch driving electrodes included in the display substrate and parallel to gate lines into N portions, wherein each portion of the touch driving electrodes is arranged in a direction perpendicular to the gate lines, and N is a positive integer greater than or equal to 2; and resetting pixels corresponding to an $n^{th}$ portion of the touch driving electrodes before a touch driving for the $n^{th}$ portion is started, so that the pixels have a same grey scale value, wherein n is a positive integer greater than or equal to 1 and less than or equal to N. At this point, all liquid crystal molecules corresponding to the $n^{th}$ portion are in a same defection state, so as to prevent the mutual capacitor between the touch driving electrodes and the touch sensing electrodes from being adversely affected by the deflections of the liquid crystal molecules, and improve the accuracy of touch detecting.

Figure 3:
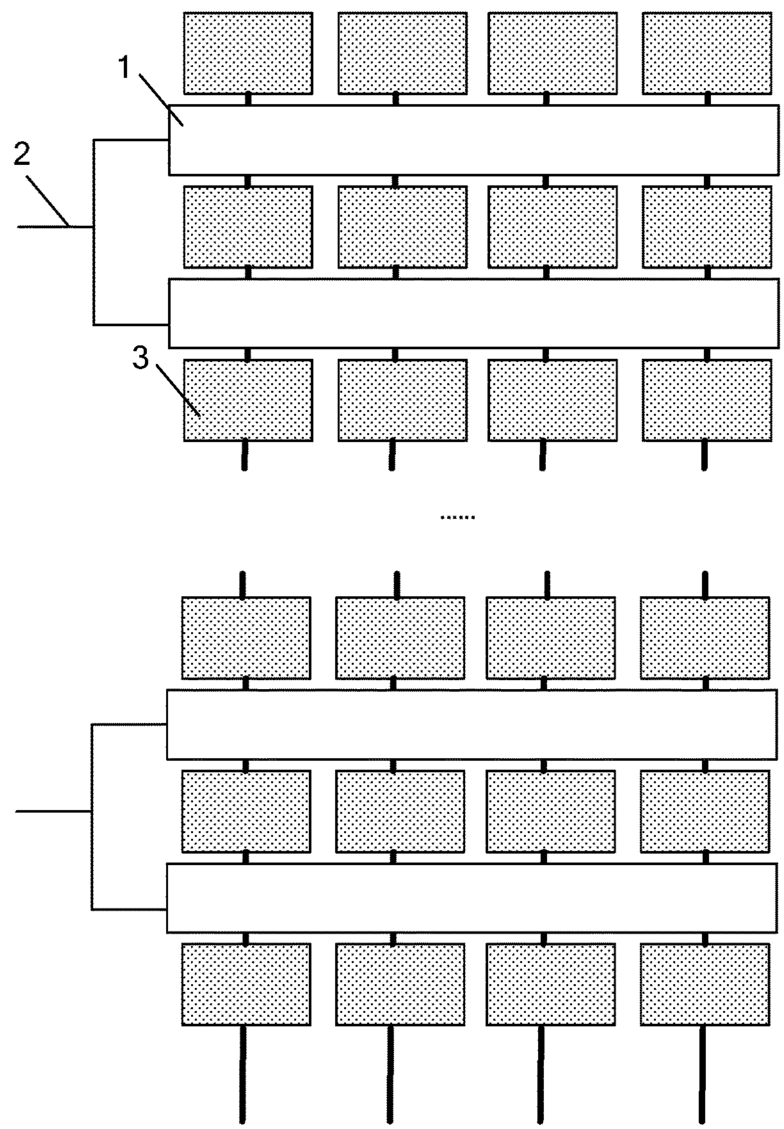
FIG. 3 is a plan view showing a display substrate according to an embodiment of the present disclosure.

The present disclosure further provides in some embodiments a display substrate having a touch function (or a display substrate for short hereafter) driven by the above method. As shown in FIG. 3, the display substrate includes a plurality of rows of touch driving electrodes 1 extending in a direction parallel to gate lines, wherein the touch driving electrodes 1 are divided into N portions, each portion of the touch driving electrodes 1 is arranged in a direction perpendicular to the gate lines, and each portion of the touch driving electrodes 1 is connected to a driving line 2, wherein N is a positive integer greater than or equal to 2. Thus, pixels corresponding to an $n^{th}$ portion of the touch driving electrodes 1 are capable of being reset to have a same grey scale value before a touch driving for the $n^{th}$ portion is started, so that all liquid crystal molecules corresponding to the $n^{th}$ portion have a same deflection state, so as to prevent the mutual capacitors between the touch driving electrodes 1 and the touch sensing electrodes 3 from being adversely affected by the deflections of the liquid crystal molecules, and improve the accuracy of touch detecting, wherein n is a positive integer greater than or equal to 1 and less than or equal to N.

In this embodiment of the present disclosure, common electrodes may be further used as the touch driving electrodes 1 to simplify the structure of the display substrate and the method for manufacturing the display substrate. At this point, during a touch driving time period for the $n^{th}$ portion, a touch driving signal "TX output" is applied to the $n^{th}$ portion of the touch driving electrodes; and during a display scanning time period for the $n^{th}$ portion, a common electrode signal is applied to the $n^{th}$ portion of the touch driving electrodes.

It should be noted that the touch driving electrodes 3 are shown in FIG. 3 to illustrate an intersection relationship between the touch driving electrodes 1 and the touch sensing electrodes 3. Alternatively, it is not necessary for the display substrate to include the touch sensing electrodes. The touch sensing electrodes 3 may be arranged on the display substrate or another display substrate which is arranged opposite to the display substrate to form a cell.

Figure 4:
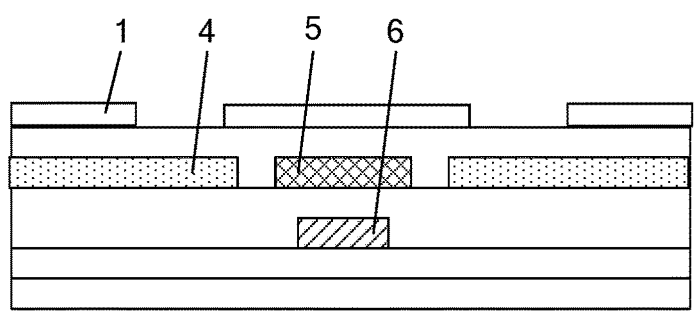
FIG. 4 is a sectional view showing a display substrate according to an embodiment of the present disclosure.

Furthermore, the display substrate further includes gate lines, data lines, TFTs and the pixel electrodes. As illustrated in FIG. 4, the pixel electrode 4 is of a plate shape, the touch driving electrode 1 is arranged above the pixel electrode 4 and insulated from the pixel electrode 4, and the touch driving electrode 1 is further used as the common electrode. The above display substrate may be applied in an ADS display apparatus. Furthermore, as illustrated in FIG. 4, the display substrate further includes a shielding structure 5 arranged above the data line 6 and arranged on a same layer as the pixel electrodes 4, so as to shield signal interference between the data lines 6 and the touch driving electrodes 1.

The present disclosure further provides in some embodiments a display substrate having a touch function, including a plurality of rows of touch driving electrodes extending in a direction parallel to gate lines, wherein the touch driving electrodes are divided into N portions, each portion of the touch driving electrodes is arranged in a direction perpendicular to the gate lines, and each portion of the touch driving electrodes is connected to a driving line, wherein N is a positive integer greater than or equal to 2. Thus, pixels corresponding to an $n^{th}$ portion of the touch driving electrodes are capable of being reset to have a same grey scale value before a touch driving for the $n^{th}$ portion is started, so that all liquid crystal molecules corresponding to the $n^{th}$ portion have a same deflection state, so as to prevent the mutual capacitors between the touch driving electrodes and the touch sensing electrodes from being adversely affected by the deflections of the liquid crystal molecules, and improve the accuracy of touch detecting, wherein n is a positive integer greater than or equal to 1 and less than or equal to N.

The present disclosure further provides in some embodiments a touch display apparatus including any of the above display substrates having the touch display function.

Furthermore, the touch display apparatus further includes an reset-enabling-signal input module for inputting a reset enabling signal to the $n^{th}$ portion before a touch driving for the $n^{th}$ portion is started, wherein the reset enabling signal enables the pixels corresponding to the $n^{th}$ portion to be reset to have the same grey scale value, wherein n is a positive integer greater than or equal to 1 and less than or equal to N.

The above are merely embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure. Thus, a scope of the present disclosure is confined in claims.

What is claimed is:

1. A method for driving a display substrate having a touch function, comprising steps of:

dividing touch driving electrodes comprised in the display substrate and parallel to gate lines into N portions, wherein each portion of the touch driving electrodes is arranged in a direction perpendicular to the gate lines, and N is a positive integer greater than or equal to 2; and resetting pixels corresponding to an nth portion of the touch driving electrodes before a touch driving for the nth portion is started, so that the pixels have a same grey scale value, wherein n is a positive integer greater than or equal to 1 and less than or equal to N;

a touch driving time period for the nth portion of the touch driving electrodes that is close to touch sensing electrodes, and merely the pixels corresponding to the nth portion are reset, wherein the touch driving time period for the nth portion of the touch driving electrodes occurs within a time period of a display scanning time period for at least another portion of the touch driving electrodes; and the touch driving time period for each portion of the touch driving electrodes occurs prior to the display scan time period for each portion of the touch driving electrodes.

2. The method according to claim 1, wherein a display scanning time period for the nth portion coincides with a touch driving time period for an (n+1)th portion of the touch driving electrodes; and a display scanning time period for the Nth portion of the touch driving electrodes coincides with a touch driving time period for a first portion of the touch driving electrodes.

3. The method according to claim 1, wherein the step of resetting the pixels corresponding to the nth portion of the touch driving electrode comprises steps of:

enabling the gate lines for controlling the pixels corresponding to the nth portion; and supplying a same voltage to the pixels corresponding to the nth portion.

4. The method according to claim 3, wherein the step of enabling the gate lines for controlling the pixels corresponding to the nth portion comprises a step of:

inputting a reset enabling signal for enabling the gate lines for controlling the pixels corresponding to the nth portion.

5. The method according to claim 3, wherein the same voltage is of a value determined by experiments to have a minimal impact on a display effect of a display apparatus comprising the display substrate.

6. The method according to claim 3, wherein the same voltage is of a value to enable the same grey scale value of the pixels corresponding to the nth portion to be 0.

7. The method according to claim 1, wherein during the touch driving time period for the nth portion, a touch driving signal is applied to the nth portion of the touch driving electrodes; and during the display scanning time period for the nth portion, a common electrode signal is applied to the nth portion of the touch driving electrodes.

8. A display substrate having a touch function, comprising a plurality of touch driving electrodes extending in a direction parallel to gate lines, wherein the touch driving electrodes are divided into N portions, each portion of the touch driving electrodes is arranged in a direction perpendicular to the gate lines, and each portion of the touch driving electrodes is connected to a driving line, wherein N is a positive integer greater than or equal to 2; and pixels corresponding to an nth portion of the touch driving electrodes are capable of being reset to have a same grey scale value before a touch driving for the nth portion is started, so that liquid crystal molecules corresponding to the nth portion have a same deflection state, wherein n is a positive integer greater than or equal to 1 and less than or equal to N;

during a touch driving time period for the nth portion, the nth portion of the touch driving electrodes is applied with a touch driving signal; and during a display scanning time period for the nth portion, the nth portion of the touch driving electrodes is applied with a common electrode signal, the nth portion is a portion of the touch driving electrodes that is close to touch sensing electrodes, and merely the pixels corresponding to the nth portion are reset, wherein the touch driving time period for the nth portion of the touch driving electrodes occurs within a time period of the display scanning time period for at least another portion of the touch driving electrodes; and the touch driving time period for each portion of the touch driving electrodes occurs prior to the display scan time period for each portion of the touch driving electrodes.

9. The display substrate according to claim 8, further comprising the gate lines, data lines, thin film transistors (TFTs) and pixel electrodes, wherein the pixel electrodes comprise slits or are strip-shaped electrodes, and the touch driving electrodes are arranged above and insulated from the pixel electrodes.

10. The display substrate according to claim 9, further comprising shielding structures arranged above the data lines and arranged on a same layer as the pixel electrodes.

11. The touch display apparatus comprising the display substrate according to claim 8.

12. The touch display apparatus according to claim 11, further comprising a reset-enabling-signal input module for inputting a reset enabling signal to the nth portion before the touch driving for the nth portion is started, wherein the reset enabling signal enables the pixels corresponding to the nth portion to be reset to have the same grey scale value, wherein n is a positive integer greater than or equal to 1 and less than or equal to N.

13. The method according to claim 2, wherein the step of resetting the pixels corresponding to the nth portion of the touch driving electrode comprises steps of:

enabling the gate lines for controlling the pixels corresponding to the nth portion; and supplying a same voltage to the pixels corresponding to the nth portion.

14. The touch display apparatus according to claim 11, further comprising the gate lines, data lines, thin film transistors (TFTs) and pixel electrodes, wherein the pixel electrodes comprise slits or are strip-shaped electrodes, and the touch driving electrodes are arranged above and insulated from the pixel electrodes.

15. The touch display apparatus according to claim 14, further comprising shielding structures arranged above the data lines and arranged on a same layer as the pixel electrodes.

16. The method of claim 1 wherein the nth portion is a portion of the touch driving electrodes that is close to touch sensing electrodes, and merely the pixels corresponding to the nth portion are reset.

* * * * *